United States Patent Office 2,824,582
Patented Feb. 25, 1958

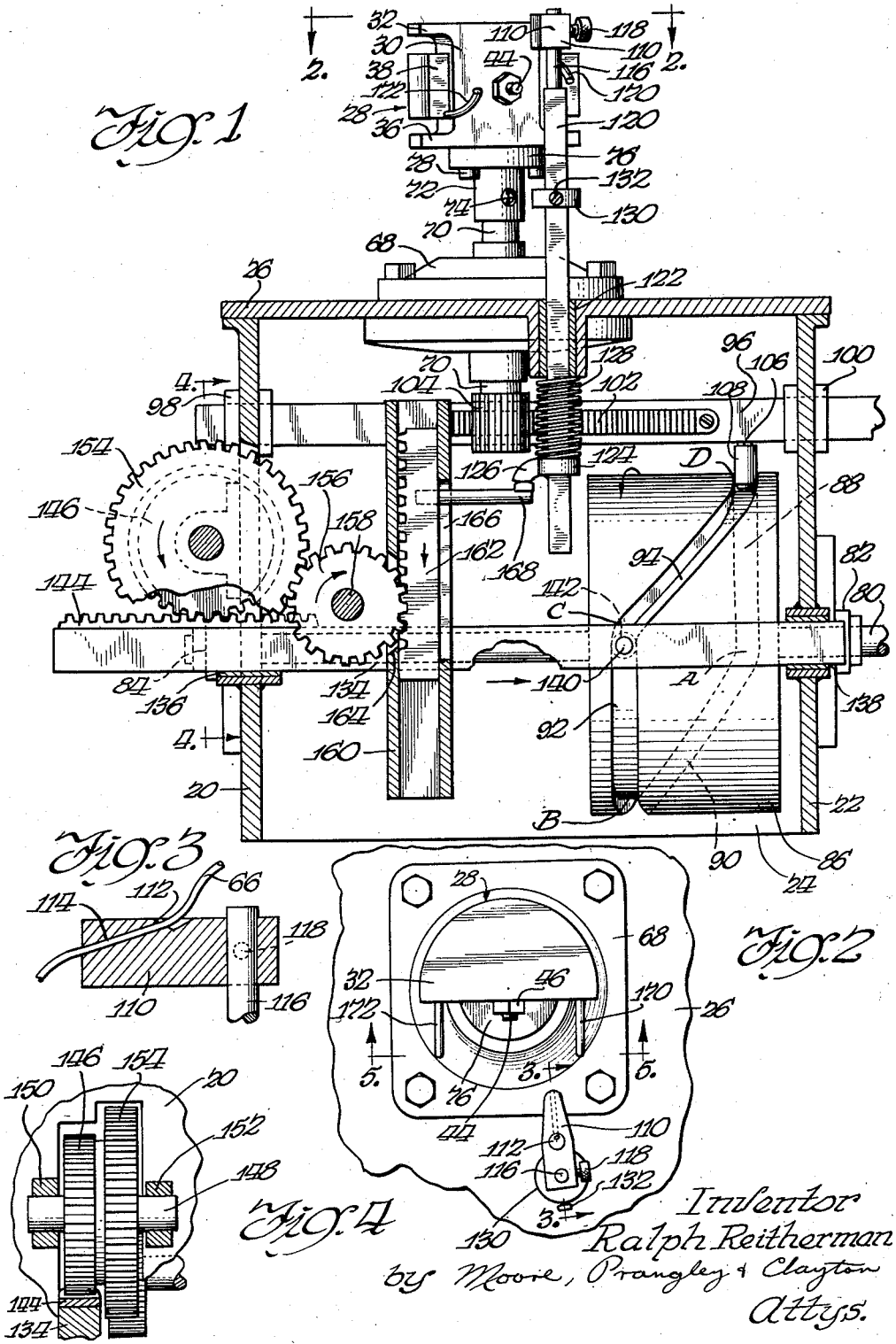

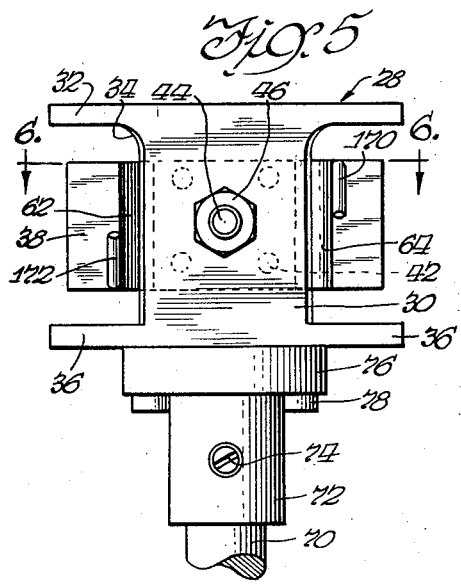
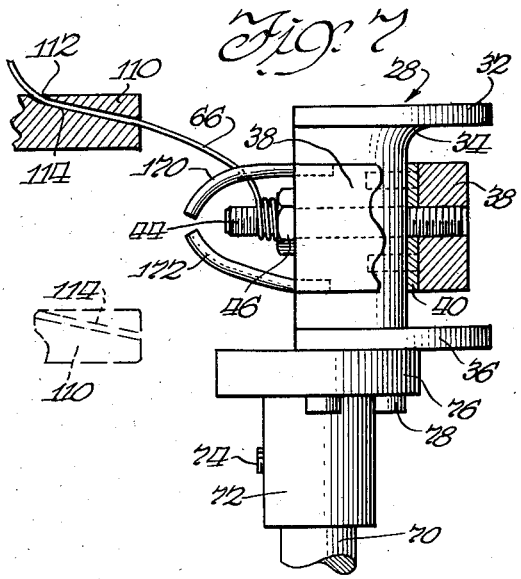
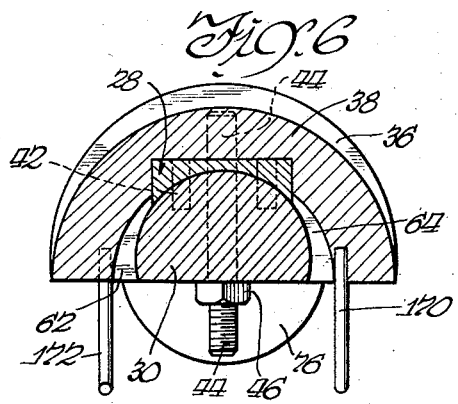
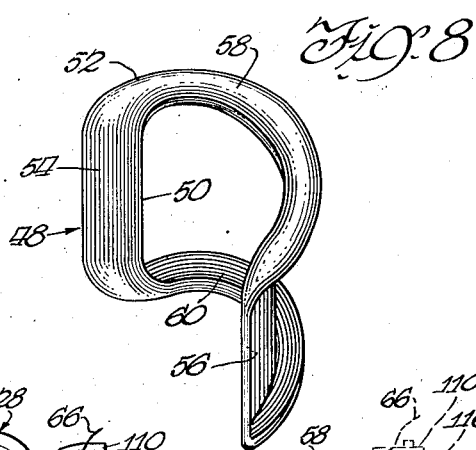
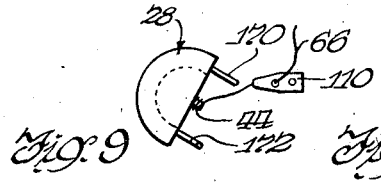
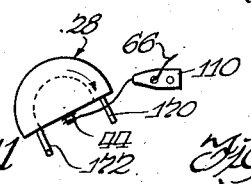
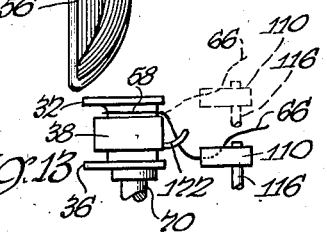
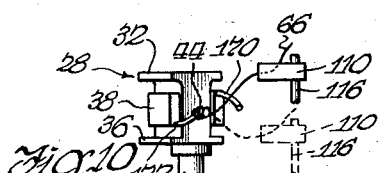
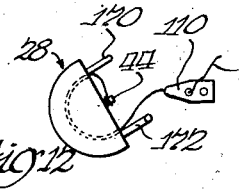
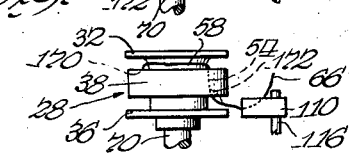

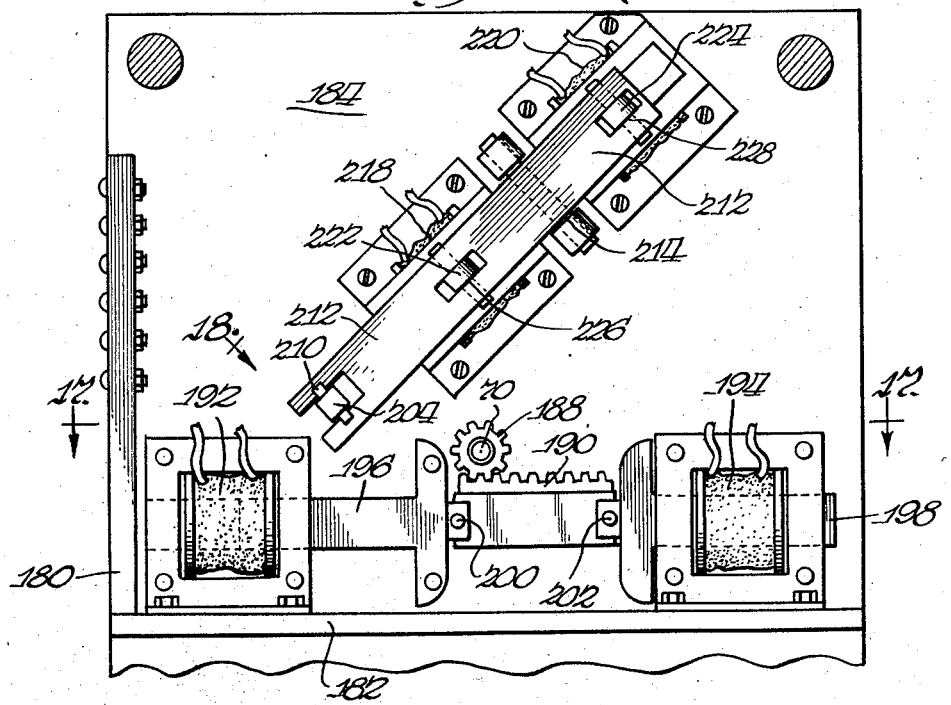

2,824,582

WINDING MECHANISM AND METHOD

Ralph Reitherman, Chicago, Ill., assignor to Geo. Stevens Manufacturing Company, Chicago, Ill., a corporation of Illinois Application April 12, 1954, Serial No. 422,451

6 Claims. (Cl. 140—92.2)

This invention relates to coil winding apparatus and particularly to coil winding machines capable of winding in a rapid and economical manner coils having relatively complicated shapes.

The coil winding machine of the present invention is adapted to wind continuous wire coils made up of a plurality of superimposed closed loops of wire, each loop having a complicated configuration, i. e., each loop does not lie in a single plane. In addition each successive loop of the coil has a slightly different shape and different size.

Coils of this type heretofore have been wound by hand or have been wound by very complicated machinery. Winding by hand is an expensive and slow process and the machinery used in mechanically winding such coils is very expensive and not particularly rapid in operation.

An important object of the invention is to provide an improved coil winding machine for winding coils of the type set forth; more particularly it is an object of the invention to provide a machine simple in construction and operation to wind coils of the type described.

Another object of the invention is to provide a coil winding machine for winding coils of the type set forth, the finished coils being of uniform shape and closely packed.

Another object of the invention is to provide a coil winding method which will produce coils of the type disclosed in an economical manner and at a rapid rate.

These and other objects and advantages of the invention will be better understood from the following description when taken in conjunction with the accompanying drawings. In the drawings wherein like reference numerals have been used to designate like parts throughout:

Fig. 1 is a view in vertical section with certain parts broken away of a machine made in accordance with and embodying the principles of the present invention;

Fig. 2 is a partial plan view of the coil winding machine shown in Fig. 1 substantially as seen in the direction of the arrows along the line 2—2 of Fig. 1, the winding head having been rotated clockwise a few degrees;

Fig. 3 is an enlarged view in vertical section of the pilot substantially as seen in the direction of the arrows along the line 3—3 of Fig. 2;

Fig. 4 is a partial view in vertical section of the drive mechanism as seen in the direction of the arrows along the line 4—4 of Fig. 1;

Fig. 5 is a partial enlarged view of the winding head forming a part of the coil winding machine of Fig. 1 substantially as seen in the direction of the arrows along the line 5—5 of Fig. 2;

Fig. 6 is a view in horizontal section of the winding head of Fig. 5 substantially as seen in the direction of the arrows along the line 6—6 of Fig. 5;

Fig. 7 is a side view of the winding head shown in Fig. 5;

Fig. 8 is a perspective view of the coil wound by the winding machine of Fig. 1;

Figs. 9 to 15 are diagrammatical views illustrating the operation of the winding machine illustrated in Fig. 1 and illustrating the method employed by the winding machine of Fig. 1;

Fig. 16 is a bottom plan view of a second embodiment of a coil winding machine incorporating the principles of the present invention;

Fig. 17 is a partial view in vertical section of the coil winding machine illustrated in Fig. 16 substantially as seen in the direction of the arrows along the line 17—17 of Fig. 16; and Fig. 18 is a partial view in vertical section of the coil winding machine shown in Fig. 16 as seen in the direction of the arrows along the line 18—18 of Fig. 16.

A first preferred embodiment of the invention is illustrated in Figs. 1–15 of the drawings. Referring to Fig. 1, it is seen that this form of coil winding machine has a frame including side walls 20, 22 and 24 and a horizontal frame member 26 supported by walls 20, 22 and 24.

The coil is wound upon a winding head generally designated by the numeral 28 which is carried by and mounted above frame member 26. The winding head 28 includes a main winding member 30 which as may be best seen from Figs. 5, 6 and 7 has a central portion that is formed as slightly more than half of a right cylinder. A port circular flange 32 is formed integral with the main winding member 30 and extends outwardly therefrom and perpendicular to the axis of member 30. The junction between flange 32 and winding member 30 is curved as at 34 to guide the wire being wound as will be explained more fully hereinafter.

A second outstanding semi-circular flange 36 is formed on the other end of winding member 30 and extends in the same direction and has substantially the same diameter as flange 32. It will be seen that the winding member 30 with its top and bottom flanges 32—36 has the appearance of slightly more than a half spool.

Affixed to winding member 30 intermediate flanges 32 and 36 is a removable core 38 which as may be best seen in Fig. 6 is shaped like half of a hollow cylinder. The vertical dimension of core 38 as viewed in Figs. 5 and 7 is substantially less than the length of winding member 30 whereby space is provided between core 38 and the flanges 32—36 to receive wire to form a coil.

In order to secure the core 38 firmly to winding member 30, a substantially rectangular cut-out is formed in core 38, the cut-out extending longitudinally of core 38. A mounting member 40 is provided to fit within this rectangular cut-out, the surface of mounting member 40 facing winding member 30 having a part circular depression therein to receive the circular outer surface of winding member 30. Mounted on mounting member 40 are four pins 42 which extend into apertures in winding member 30 so that mounting member 40 is accurately aligned and positioned with respect to winding member 30. Winding member 30, core 38 and mounting member 40 are held in assembled relationship by a threaded screw 44 which threads into each of these three members and receives at one end a lock nut 46.

Referring now to Fig. 8, one form of complicated coil which can be wound by the winding machine of the present invention will be described in detail. This coil which is generally designated by the numeral 48 is made up of a plurality of closed loops. The first closed loop wound on the coil is the smallest and innermost loop which is designated by the numeral 50. Loop 50 extends around the entire inner periphery of coil 48. Each successive loop is slightly larger, the last coiled loop being indicated by the numeral 52 and being the largest loop composing coil 48. Superimposed layers of loops at one point 54 form a relatively straight and flat coil section. Similarly formed flat coil section 56 is formed opposite coil section 54. The inwardly facing surfaces of coil sections 54 and 56 are curved and correspond to the circumference of the winding member 30, see Fig. 6. Joining coil sections 54 and 56 at their upper ends is a part circular coil section 58 which extends outwardly from coil sections 54 and 56 and is a continuation of the curvature of the inner face of coil sections 54 and 56. A curved part circular coil section 60 joins the flat coil sections 54—56 at their lower ends. It will be seen that each loop has a portion thereof which lie in each of sections 54, 56, 58 and 60.

Referring again to Figs. 5, 6 and 7 the coil section 54 is formed in the space designated by the numeral 62 between core 38 and winding member 30. Coil section 56 is similarly formed in the space 64 between winding member 30 and core 38, coil section 58 is formed between flange 32 and core 38, and coil section 60 is formed between flange 36 and core 38.

In general the manner of winding the coil 48 on the winding head 28 is as follows. One end of a wire 66 (see Fig. 7) is anchored as by winding around screw 44. The wire 66 is then lifted upwardly and laid across the top of core 38 to form the first loop of coil section 58. The wire is then moved downwardly through space 62 (Fig. 6) to form the first layer of coil section 54. The wire is then wrapped around the bottom of core 38 between core 38 and flange 36 and then upwardly through space 64 to form the first layer of coil section 56. The first loop 50 is thus formed. Successive loops are then laid on top of loop 50 until the completed coil 48 has been formed.

Referring now particularly to Fig. 1 of the drawings, the mechanism for moving winding head 28 and for winding wire thereon to form the coil 48 will be described in detail. Mounted on frame member 28 is a bearing 68 which rotatably supports a shaft 70. A collar 72 is fixed to shaft 70 by a set screw 74, the upper end of collar 72 having an outwardly extending flange 76. Winding head 28 is attached to flange 76 by a plurality of bolts 78.

In order to accomplish the winding operation described above it is necessary that winding head 28 oscillate with shaft 70, the oscillation being less than a full revolution. The power for rotating shaft 70 and winding head 28 is derived from a main power shaft 80 which is carried by bearings 82 and 84 mounted on the walls 22 and 20 respectively. Mounted upon shaft 80 between walls 20 and 22 is a barrel cam 86 having a continuous groove therein around the outer circumference thereof and including cam groove sections 88, 90, 92 and 94. Cam grooves 88 and 92 are substantially perpendicular to the axis of shaft 80 and are spaced apart longitudinally of shaft 80. The lower end of groove 88 as viewed in Fig. 1 is joined at point "A" by cam groove 90 which is curved along the axis of shaft 80 and connects with cam groove 92 at point "B." The upper end of cam groove 92 is connected as at point "C" to cam groove 94 which is directed to the right and joins with the upper end of cam groove 88 as at point "D." In operation shaft 80 and barrel cam 86 are rotated in a counterclockwise direction as viewed from the right in Fig. 1 by a prime mover (not shown).

A slide 96 is provided and is mounted for horizontal reciprocation in a pair of bearing members 98 and 100 formed in walls 20 and 22, respectively. Mounted on one side of slide 96 is a toothed rack 102 which meshes with and turns a gear 104 mounted on the lower end of shaft 70. Movement of rack 102 rotates gear 104 and shaft 70 and the winding head attached thereto.

Attached to the lower side of slide 96 is a shaft 106 which rotatably supports a rotary cam follower 108 which fits within and is driven by the groove in barrel cam 86. During the next quarter revolution of bearing cam 86 from the position illustrated in Fig. 1, the cam follower 108 will move along the straight groove section 88 from point "D" to point "A." There will be no movement of cam follower 108 or slide 96 during this quarter revolution of cam 86. During the next quarter revolution of cam 86, cam follower 108 will move along the slanting groove section 90 to the left from point "A" to point "B" and this will move slide 96 to the left. This movement of slide 96 will rotate gear 104 and the attached winding head 108 in a counterclockwise direction when viewed from the top in Fig. 1. During the next quarter revolution, cam follower 108 will move along the straight groove section 92 from point "B" to point "C." This will cause no change in the position of winding head 28. During the next quarter revolution of cam 86, the cam follower 108 will move from point "C" to point "D" along groove section 94 thus shifting slide 96 to the right. This movement of slide 96 to the right will rotate gear 104 and the attached winding head 28 in a clockwise direction as viewed from the top in Fig. 1.

The wire 66 is fed onto winding head 28 through a pilot 110. As is best seen from Figs. 2 and 3 pilot 110 is a substantially rectangular piece of metal which tapers slightly toward the end facing winding head 28. Formed on the upper surface of pilot 110 is a conical cut-out portion 112 which connects with a guide hole 114 and that extends downwardly and toward the end of pilot 110 which is pointed toward the winding head 28. Referring to Figs. 1 and 2 it will be seen that pilot 110 is supported by a shaft 116 that passes through an aperture therein and is fixedly attached to shaft 116 by a set screw 118.

The lower end of shaft 116 is formed square as at 120 and passes through and is supported by a bearing 122 formed on the upper base plate 26. The lower end of shaft 120 has attached thereto a collar 124 having an outwardly extending arm 126. There is positioned between collar 124 and bearing 122 a spring 128 which normally urges shaft 120 and pilot 110 downwardly. The length of travel of shaft 120 downwardly is limited by a collar 130 that is positioned stationary on shaft 120 by means of a set screw 132. Collar 130 provides an adjustable stop to limit the distance that shaft 120 and pilot 110 can move downwardly under the influence of spring 128.

During the winding operation it is necessary that pilot 110 be reciprocated in a vertical direction as viewed in Fig. 1 and to this end there is provided a driving connection with the power shaft 80 through drum cam 86. A horizontally disposed slide 134 is supported by a bearing member 136 on wall 20 and another bearing member 138 on wall 22. Attached to slide 134 toward the right hand end thereof is a shaft 140 rotatably supporting cam follower 142 which fits in the cam groove on barrel cam 86. Cam follower 142 is of the type which is rotatably mounted upon a shaft so that it can have rolling contact with the edges of the cam grooves in barrel cam 86. The upper surface of slide 134 at its left hand end is provided with a toothed rack 144 which meshes with a gear 146. As may be best seen from Fig. 4 a gear 146 is mounted upon a shaft 148 which is in turn carried by bearings 150 and 152 mounted on wall 20.

Formed integral with gear 146 is a second larger gear 154 which is concentric with and rotates with gear 146. Gear 154 meshes with and drives an idler gear 156 mounted on a support shaft 158. Mounted adjacent idler gear 156 is a guide member 160 which carries therein a sliding toothed rack 162 which meshes with idler gear 186 through a slot 164 formed in the side of guide member 160. Extending through a second slot 166 in guide member 160 and attached to toothed rack 162 is an arm 168 which engages arm 126 on the under side thereof. Arm 168 is reciprocated in a vertical direction by the gear train described above and acting through arm 126 reciprocates pilot 110 in a vertical direction. More specifically when barrel cam 86 is rotated counterclockwise as explained before, cam follower 142 on slide 134 will move along groove section 94 from point "C" to point "D." This will move slide 134 to the right as viewed in Fig. 1 thus rotating gears 146 and 154 counterclockwise and rotating idler gear 156 clockwise. Idler gear 156 will thus drive rack 162 downwardly lowering arm 166. This will permit arm 126 attached to shaft 120 to drop under the urging of spring 128 thus lowering pilot 110.

Further revolution of the barrel cam 86 will move cam follower 152 from point "D" to point "A" along the straight groove section 88 thus holding pilot 110 stationary. During the next quarter revolution of barrel cam 86 the cam follower 142 will move from point "A" to point "B" along the slanting groove section 90 and thus move slide 134 to the left. This motion of slide 134 rotates gears 146 and 154 clockwise thus rotating idler gear 156 counterclockwise. Counterclockwise rotation of idler gear 156 moves rack 162 upwardly moving arms 126 and 168 upwardly against the action of spring 128. This moves pilot 110 upwardly to the position shown in Fig. 1.

The manner in which the coil 48 of Fig. 8 is wound on the apparatus shown in Fig. 1 will now be described in detail with particular reference to Figs. 9 through 15 which diagrammatically show the steps in winding a typical loop of coil 48. The winding operation is begun by anchoring the wire 66 to the bolt 44 as illustrated in Figs. 7 and 9. The angular relationship between the winding head 28 and pilot 110 at this point of the operation is shown in Fig. 9, these members being viewed from above. The pilot 10 is initially in the lowered position. When the winding head 28 and the pilot 110 are in the position shown in Fig. 9, the cam follower 108 is at point "B" and the cam follower 142 which controls pilot 110 is at point "A." In other words the barrel cam 86 is rotated 180° counterclockwise from the position illustrated in Fig. 1.

When the parts are in the position described above, barrel cam 86 is rotated one quarter revolution counterclockwise so that cam 108 moves from point "B" to point "C" and cam 142 moves from point "A" to point "B." Since came groove 92 between points "B" and "C" is straight, the winding head 28 will remain stationary. The pilot 110 will move upwardly because the cam groove connecting points "A" and "B" is diagonal and moves slide 134 to the left thus moving rack 162 and shaft 120 upwardly. Figs. 10 and 11 are side views and top views, respectively, of the parts in this described position.

The face of core 38 directed toward pilot 110 has formed on the upper edge thereof and extending outwardly therefrom a wire guide 170 which extends outwardly therefrom and curves downwardly as may be best seen in Figs. 5, 7 and 10. It is now desired to rotate winding head 28 in a clockwise direction as viewed in Fig. 11. This is accomplished by rotating barrel cam 86 one quarter revolution counterclockwise thereby moving cam follower 108 from point "C" to point "D" along the inclined cam groove 94. The relationship between the parts is such that this movement of cam follower 108 causes a 330° clockwise rotation of winding head 28. Guide 170 moves wire 66 upwardly onto the upper surface of core 38 and further rotation of winding head 28 wraps wire 66 therearound until the parts are in the position shown in Fig. 12. This forms the first layer of coil section 58 (see Fig. 8).

It is next desired to move the pilot 110 downwardly to lay the first layer of coil section 54. The required movement of pilot 110 is achieved by rotating drum cam 86 another one quarter revolution clockwise which moves cam 142 from point "C" to point "D." This movement of cam follower 142 moves pilot 110 from an upper position to the lower position as is diagrammatically shown in Fig. 13. Since cam follower 108 is moving along the straight cam groove 88 from point "D" to point "A," winding head 28 will remain stationary. This places a layer of coil section 54 in space 62 (see Fig. 6) at the junction of winding member 30 and core 38.

There is provided on the lower portion of core 38 on the left hand side thereof as viewed in Fig. 5 an outwardly extending and upturned wire guide 172. Rotation of winding head 28 in a counterclockwise direction will draw wire 66 under guide 172 and lay the first layer of coil section 66 on the lower side of core 38.

The necessary movement of the winding head 28 is achieved by rotating the barrel cam 88 another quarter revolution counterclockwise which moves the cam follower 108 from point "A" to point "B." Movement of the cam follower along the slanting cam groove 90 joining points "A" and "B" moves cam follower 108 to the left thus moving slide 96 to the left also. This rotates gear 104 and winding head 28 in a counterclockwise direction. The proportions among the parts is such that the counterclockwise movement imparted to winding head 28 in moving cam follower 108 from point "A" to point "B" is approximately 330°. Fig. 14 shows the parts in an intermediate position and Fig. 15 is a side view of the parts in the position shown in Fig. 14. When the counterclockwise rotation of winding head 28 is completed, the parts will be in the position shown in Fig. 9.

The last coil section 56 is laid by moving pilot 110 upwardly as has been described before. This places a layer of coil section 56 in the space 64 (see Fig. 6) at the junction of winding member 30 and core 38.

The above operation is repeated mechanically a great number of times whereby to build up sufficient layers to form the finshed coil 48. The described apparatus forms the coil 48 in an efficient manner with a minimum of manual operations and a minimum of supervision.

After a sufficient number of loops of wire have been coiled to form coil 48 the end of wire 66 wrapped around bolt 44 is unwound and bolt 44 is withdrawn. This permits removal of core 38 after which coil 48 can be removed from winding head 28. After replacing core 38 and bolt 44 the apparatus is in condition to begin winding another coil.

Referring now to Figs. 16, 17 and 18 there is shown an electrical apparatus for performing the same winding operation described with respect to Figs. 1 through 15. In this form of the invention a frame including side plates 180 and 182 supporting a top plate 184 is provided. Mounted upon plate 184 is a bearing 186 which corresponds to the bearing 68 of Fig. 1. The bearing 186 supports a shaft 70 on the upper end of which is mounted winding head 28 as described above with respect to Figs. 1 through 15.

The lower end of shaft 70 is provided with a toothed gear 188 which meshes with and is driven by a toothed rack 190. Motive power for moving rack 190 is provided by a pair of solenoids 192 and 194 provided with movable cores 196 and 198, respectively. The left hand end of rack 190 is pivotally attached as at 200 to core 196 and the right hand end of rack 190 is pivotally attached as at point 202 to core 198. Solenoids 192 and 194 are electrically interconnected to act in opposition whereby to cause periodical oscillation of shaft 70 and the winding head 28 attached thereto.

A shaft 204 is provided which corresponds to shaft 120 in Fig. 1. On the upper end of shaft 204 is mounted the pilot 110. Shaft 204 passes through the top plate 184 and is guided by a bearing 206 mounted on the underside of plate 184. A pair of pins 208 and 210 pass through and are affixed to the lower end of shaft 204. Positioned between pins 208—210 is a Y-shaped end of a bar 212. Bar 212 is also pivotally supported as at point 214 on an arm 16 mounted under and carried by plate 184.

Mounted on the underside of plate 184 and positioned on either side of arm 216 are solenoids 218 and 220. Solenoid 218 is provided with a movable core 222 and solenoid 220 is provided with a similar movable core 224. Core 222 is pivotally attached to bar 212 as at point 226 and core 224 is pivotally attached to bar 212 at point 228. Suitable electrical connections are provided so that solenoids 218 and 220 are energized at the proper times. Energization of solenoid 220 lowers pilot 110 if solenoid 218 is deenergized and energization of solenoid 218 moves pilot 110 upwardly if solenoid 220 is deenergized.

It will be seen that a proper sequence of energization of solenoids 192, 294, 218 and 220 will impart the proper motions to winding head 28 and pilot 110 whereby to wind a coil such as coil 48 in Fig. 8. It is also possible to provide suitable limit switches or to provide an automatic switching device driven at a constant rate to give a proper sequence of energization of all four solenoids.

More specifically winding one loop of coil 48 would be accomplished as follows. Referring to Figs. 9 to 15, the winding head 28 and the pilot 110 would be placed in the position illustrated in Fig. 9 with the pilot 110 in the lowermost position by energizing the solenoids 192 and 220. In the first step of the winding operation, i. e., in going from the position illustrated in Fig. 9 to the position illustrated in Fig. 10, it is necessary to maintain winding head 28 stationary and move pilot 110 upwardly. This is accomplished by leaving solenoid 192 energized, deenergizing solenoid 220 and thereafter energizing solenoid 218. This will move the parts to the position shown in Fig. 10.

It is next necessary to rotate winding head 28 in a clockwise direction about 330° to the position shown in Fig. 12. This is accomplished by leaving solenoid 218 energized, deenergizing solenoid 192 and energizing solenoid 194.

In the next step of the winding operation, winding head 28 must remain stationary and pilot 110 moved to the lowered position as shown in Fig. 13. This can be accomplished by leaving solenoid 194 energized, deenergizing solenoid 218 and energizing solenoid 220.

It is next necessary to rotate winding head 14 counterclockwise 330° while leaving pilot 110 in the lower position as is illustrated in Figs. 13, 14 and 15 of the drawings. This is accomplished by leaving solenoid 220 energized, deenergizing solenoid 194 and energizing solenoid 192.

In the final step of winding coil 48, the winding head 28 remains stationary and the pilot 110 is moved upwardly to the position shown in solid lines in Fig. 10 thus laying the first layer of coil section 56. This motion is accomplished by leaving solenoid 192 energized, deenergizing solenoid 220 and energizing solenoid 218.

The successive loops and layers of coil 48 are wound by a repetition of the above steps until all of the layers of coil 48 have been wound. The core 38 is then removed thereby permitting the finished coil 48 to be removed. Replacement of core 38 on winding head 28 placed the apparatus in condition for winding the next coil.

It will be seen from the above description that there has been provided and described in the specification two coil winding mechanisms which fulfill the objects and advantages set forth above. Although these specific forms of the invention have been described for purposes of illustration, it is to be understood that various changes and modifications can be made therein without departing from the spirit and scope of the invention. Accordingly, the invention is to be limited only as set forth in the following claims.

What is claimed is:

1. An oscillating winding head comprising a part-cylindrical body having a longitudinal axis of oscillation, a pair of flanges formed on said body and extending outwardly therefrom substantially perpendicular to the axis thereof, the junction between said flanges and said body being contoured to shape a coil wound thereon, a core mounted on said body between the flanges thereof to provide coil receiving recesses therebetween, said cores at the ends thereof disposed toward said axis of oscillation being spaced from said body at spaced apart points to provide coil receiving recesses therebetween, and a wire guide mounted at each end of said core adjacent said first mentioned coil receiving recesses to guide wire into said recesses, said wire guides extending outwardly beyond the axis of oscillation of said body.

2. A winding head as set forth in claim 1 wherein one wire guide has a guiding surface positioned near one flange to direct wire into the associated coil receiving recess and the other wire guide has a guiding surface positioned near the other flange to direct wire into the associated coil receiving recess.

3. A winding head as set forth in claim 1, wherein a single fastener detachably mounts the core on the part-cylindrical body for rapid assembly on and detachment from the body.

4. A coil winding machine comprising a frame, a winding head mounted for oscillation on said frame about an axis of oscillation, said winding head including a part-cylindrical body having a longitudinal axis coincident with the axis of oscillation, a pair of flanges formed on said body and extending outwardly therefrom substantially perpendicular to the axis thereof, the junction between said flanges and said body being contoured to shape a coil wound thereon, a core mounted on said body between the flanges thereof to provide coil receiving recesses therebetween, said cores at the ends thereof disposed toward said axis of oscillation being spaced from said body at spaced apart points to provide coil receiving recesses therebetween, and a wire guide mounted at each end of said core adjacent said first mentioned coil receiving recesses to guide wire into said recesses, said wire guides extending outwardly beyond the axis of oscillation of said body, a wire feeding member mounted adjacent said winding head for reciprocation in a direction parallel to the axis of oscillation of said winding head, and drive mechanism to oscillate said winding head about its axis of oscillation and to reciprocate said wire feeding member in predetermined relation to oscillation of said winding head to wind a coil of wire on said winding head within said coil receiving recesses.

5. A coil winding machine as set forth in claim 4, wherein said drive mechanism comprises a barrel cam mounted on said frame for rotation thereon and having a cam track thereon, a first cam follower engaging said barrel cam and driving a slide to oscillate said winding head about its axis of oscillation, and a second cam follower engaging said barrel cam and driving a slide to reciprocate said wire feeding member along a rectilinear path, said cam followers engaging said cam track at spaced apart points, said first cam follower oscillating said winding head through an angle greater than 180° while said wire feeding member is stationary, said second cam follower reciprocating said wire feeding member when said winding head is stationary.

6. A coil winding machine as set forth in claim 4, wherein the drive mechanism comprises a gear connected to the winding head, a toothed rack engaging said gear, a solenoid connected to each end of said rack, energization of one of said solenoids causing movement of said rack and rotation of said gear to rotate said winding head, a pivotally mounted lever arm connected at one end to the wire feeding member, and a pair of solenoids connected to said lever arm on opposite sides of the pivot point of said lever arm, energization of one of said solenoids causing reciprocation of said wire feeding member.

References Cited in the file of this patent

UNITED STATES PATENTS

| | | |
|---|---|---|
| 1,346,139 | Smith | July 13, 1920 |
| 1,460,785 | Buckley | July 3, 1923 |
| 1,555,745 | Carrasco | Sept. 29, 1925 |
| 1,977,828 | Laib | Oct. 23, 1934 |
| 2,149,941 | Prentice | Mar. 7, 1939 |
| 2,389,336 | Wirth | Nov. 26, 1945 |
| 2,448,672 | Knauf | Sept. 7, 1948 |
| 2,496,913 | Grundmann | Feb. 7, 1950 |
| 2,533,506 | Richard | Dec. 12, 1950 |
| 2,565,331 | Torsch | Aug. 21, 1951 |
| 2,606,723 | Burdulis | Aug. 12, 1952 |
| 2,638,943 | Bugg | May 19, 1953 |